(12) United States Patent
Lambert et al.

(10) Patent No.: US 10,890,939 B2
(45) Date of Patent: Jan. 12, 2021

(54) RECOVERY OF REFERENCE CLOCK ON A DEVICE

(71) Applicant: Cirrus Logic International Semiconductor Ltd., Edinburgh (GB)

(72) Inventors: Bradley Allan Lambert, Austin, TX (US); Bruce E. Duewer, Round Rock, TX (US); David Hisky, Leander, TX (US); Marc J. Kobayashi, Austin, TX (US); Michael A. Kost, Cedar Park, TX (US)

(73) Assignee: Cirrus Logic, Inc., Austin, TX (US)

(*) Notice: Subject to any disclaimer, the term of this patent is extended or adjusted under 35 U.S.C. 154(b) by 162 days.

(21) Appl. No.: 15/926,643

(22) Filed: Mar. 20, 2018

(65) Prior Publication Data

US 2018/0307293 A1  Oct. 25, 2018

Related U.S. Application Data

(60) Provisional application No. 62/489,196, filed on Apr. 24, 2017.

(51) Int. Cl.
*G06F 1/04*  (2006.01)
*G06F 1/10*  (2006.01)
(Continued)

(52) U.S. Cl.
CPC ............. *G06F 1/10* (2013.01); *G06F 1/12* (2013.01); *G06F 1/3215* (2013.01);
(Continued)

(58) Field of Classification Search
CPC . G06F 1/10; G06F 1/12; G06F 1/3215; G06F 13/385
(Continued)

(56) References Cited

U.S. PATENT DOCUMENTS 5,675,772 A * 10/1997 Liu ................. G06F 9/3879
703/27
7,403,583 B1   7/2008 Bruening et al.
(Continued)

OTHER PUBLICATIONS

International Search Report and Written Opinion of the International Searching Authority, International Application No. PCT/US2018/028845, dated Jul. 9, 2018.
(Continued)

*Primary Examiner* — Volvick Derose
(74) *Attorney, Agent, or Firm* — Jackson Walker L.L.P.

(57) ABSTRACT

A method for generating a not-yet (NYET) signal in a recovered reference system for recovering a device reference clock on a device, wherein the NYET signal indicates that the device is not yet ready for transition into a low power mode, in order to improve a quality of a recovered reference clock representative of a host reference clock of a host communicatively coupled to the device, may be provided. The method may include detecting receipt of start-of-frame markers from the host to the device, responsive to detecting receipt of the markers, determining whether a condition for NYET generation is being met, responsive to the condition for NYET generation being met, generating the NYET signal to cause the host to continue generating the markers, and responsive to the condition for NYET generation not being met, causing the device to generate an acknowledge signal for transition of the device into the low power mode.

16 Claims, 7 Drawing Sheets

(51) Int. Cl.
 *G06F 13/38* (2006.01)
 *G06F 1/3215* (2019.01)
 *G06F 1/12* (2006.01)
 *G06F 13/42* (2006.01)
 *G06F 1/3234* (2019.01)
 *G06F 1/08* (2006.01)

(52) U.S. Cl.
 CPC .......... *G06F 1/3278* (2013.01); *G06F 13/385* (2013.01); *G06F 13/4265* (2013.01); *G06F 13/4278* (2013.01); *G06F 1/08* (2013.01); *G06F 2213/0042* (2013.01)

(58) Field of Classification Search
 USPC ........................................................ 713/503
 See application file for complete search history.

(56) References Cited

U.S. PATENT DOCUMENTS

| | | | | |
|---|---|---|---|---|
| 8,255,708 B1* | 8/2012 | Zhang | .................. | G06F 1/3206 |
| | | | | 713/300 |
| 8,787,471 B1 | 7/2014 | Lifshitz | | |
| 2001/0018721 A1* | 8/2001 | McKenna | ............. | G06F 13/409 |
| | | | | 710/305 |
| 2001/0043572 A1 | 11/2001 | Bilgic et al. | | |
| 2002/0034178 A1* | 3/2002 | Schmidt | ............ | H04L 29/12009 |
| | | | | 370/386 |
| 2004/0076407 A1 | 4/2004 | Filo et al. | | |
| 2005/0073952 A1 | 4/2005 | Champlin et al. | | |
| 2006/0023824 A1 | 2/2006 | Greco et al. | | |
| 2007/0239900 A1 | 10/2007 | Beasley et al. | | |
| 2008/0043750 A1 | 2/2008 | Keels et al. | | |
| 2008/0079465 A1* | 4/2008 | Sung | ........................ | G06F 1/04 |
| | | | | 327/101 |
| 2011/0109371 A1* | 5/2011 | Kastl | ..................... | G06F 1/3203 |
| | | | | 327/427 |
| 2013/0145186 A1* | 6/2013 | Chu | ..................... | G06F 1/3209 |
| | | | | 713/310 |
| 2013/0301872 A1* | 11/2013 | Flaharty | ................. | H04N 5/913 |
| | | | | 382/100 |
| 2014/0143583 A1 | 5/2014 | Yang | | |
| 2014/0334501 A1 | 11/2014 | Sharma | | |
| 2016/0170472 A1* | 6/2016 | Cosaro | .................. | G06F 1/3287 |
| | | | | 710/104 |
| 2017/0257233 A1* | 9/2017 | Sung | .................. | H04L 5/0048 |
| 2018/0210652 A1* | 7/2018 | Chen | ........................ | G06F 1/08 |

OTHER PUBLICATIONS

International Search Report and Written Opinion of the International Searching Authority, International Application No. PCT/US2018/028853, dated Jul. 30, 2018.

USB ORG: "USB 2.0 Link Power Management Addendum", Universal Serial Bus Specification, Revision 2.0, Jul. 16, 2007, pp. 1-29.

* cited by examiner

RECOVERY OF REFERENCE CLOCK ON A DEVICE

RELATED APPLICATION

The present disclosure claims priority to U.S. Provisional Patent Application Ser. No. 62/489,196, filed Apr. 24, 2017, which is incorporated by reference herein in its entirety.

FIELD OF DISCLOSURE

The present disclosure relates in general to circuits for electronic devices, including without limitation audio devices, including personal audio devices such as wireless telephones and media players, and more specifically, to systems and methods relating to recovering a device reference clock on a device, the device reference clock proportional to a host reference clock of a host, when clock signaling from the host to the device is unavailable.

BACKGROUND

Universal Serial Bus ("USB") is a well-known industry communication protocol for electronic devices. USB provides a well-defined standard protocol that allows electronic devices to communicate with each other and to provide power delivery to them as well. Various versions of the USB protocol exist, such as USB 1.x, USB 2.0, USB 3.0, USB 3.1, USB-C.

FIG. 1 illustrates timing diagrams for communication between a host and a device coupled to each other via a protocol version of USB, as is known in the art. A host may receive as an input an audio signal and then send it to the device through a respective version of the USB protocol. The device may then respectively output the audio signal. FIG. 1 shows examples of the USB protocol version being USB 2.0 or USB 1.1.

For the various USB protocol versions, a number of USB modes of operation have been defined and are well understood. Such example modes of operation include: L0—High Power; L1—Sleep; L0/L1 mode—Mode that alternates between L0 and L1 modes; L2—Suspend. The USB modes of operation are defined for host-device paired communications, and their communications are coordinated based on the defined USB standards.

Certain USB protocol versions, such as USB 2.0, operate in a High Speed mode. A typical High Speed operational frequency value is 8 kHz, which refers to the operational frame rate of a microframe. When operating in a USB High Speed mode, the host may use a crystal for its clock and may have a high-speed USB interface (e.g., USB 2.0 interface) that is used to couple and communicate to a device. USB communication in the High Speed mode may operate in either the L0, L1, L0/L1, or L2 operating mode.

Other versions of USB, such as USB 1.1, operate in Full Speed mode. A typical Full Speed operational frame rate is 1 kHz. When operating in a USB Full Speed mode, the host may use a crystal for its clock and have a Full Speed USB interface (e.g., USB 1.1 interface) that is used to couple and communicate with a device. The USB communication in the Full Speed mode may operate only in the L0 and L2 operating modes.

An audio signal may be communicated by the host as USB data at a USB clock rate to the device. As already well known in the USB protocol, the USB data may be provided by the host to the device in the form of a DP (Data Plus) and DM (Data Minus) payload ("DP/DM payload") and through a DP/DM interface.

When operating in the L0 High Power operating mode, the USB system may always be awake and operational. The USB system may operate in the L0 High Power operating mode when audio content is being communicated between host and device. The USB system may go into and operate in an L1 Sleep operating mode, for example, when audio content from the audio signal is silent and not detected and being transmitted from host to device or, as a further example, when enough data is sent that no further audio data needs to be sent for some start-of-frame (SOF) periods. For some configurations, there may exist up to 4 milliseconds between SOFs in order to play continuous audio. The USB system may then operate in an L0/L1 mode in which the USB system toggles or alternates its operation between the L0 High Power operating mode and the L1 Sleep operating mode, such as when audio content is respectively being detected and actively transmitted between host and device and when there is silence and audio content is not present or when enough data has been sent that no further audio data needs to be sent for some SOF periods.

If the USB protocol version that is used by a USB system is a High Speed protocol, such as USB 2.0, the data service interval for the High Speed protocol may be defined as a microframe duration, and the typical microframe duration for USB 2.0 is defined as 125 microseconds based on the periodic value of the operational frequency of 8 kHz for the High Speed protocol. On the other hand, if the USB protocol version is instead a Full Speed protocol, such as USB 1.1, the data service interval for the Full Speed protocol is defined as a frame duration, and the typical frame duration for USB 1.1 is defined as 1 millisecond based on the periodic value of the operational frequency of 1 kHz for the Full Speed protocol. For the High Speed protocol (USB 2.0), an SOF marker indicates the beginning of a microframe and a next SOF marker indicates the end of that microframe and the beginning of a next microframe. Similarly, for the Full Speed protocol (USB 1.1), an SOF marker indicates the beginning of a frame and a next SOF marker indicates the end of that frame and the beginning of a next frame. In other words, the data service interval is defined from SOF marker to SOF marker. The data service interval for the High Speed protocol (USB 2.0) is defined from microframe-to-microframe while the data service interval for the Full Speed protocol (USB 1.1) is defined from frame-to-frame.

FIG. 1 also depicts a USB data structure when the USB protocol is in the L0 High Power operating mode (e.g., see the example "L0" timing signal diagram). The data structure in the L0 operating mode shows each data service interval being defined from SOF-to-SOF with the audio data/content embedded therein. FIG. 1 further shows that the operating mode may be alternated or toggled between the L0 and L1 operating modes (e.g., see example "L0/L1" and "Mode" timing signal diagram).

However, a problem occurs as the operating mode transitions from the L0 mode to the L1 mode in that the SOF marker that would exist when in the L0 mode disappears when transitioning into the L1 mode. A USB host may have a crystal clock time base (e.g., USB clock), and the USB device may have a local time base. The USB host may transmit SOF markers via the USB link to the USB device from time-to-time. The SOF markers may disappear or go absent when the USB system transitions from L0 High Power operating mode to L1 Sleep operating mode. The disappearance of the SOF is further illustrated in FIG. 1 by the dotted blank boxes/markers in the L0/L1 timing signal diagram. As the transition from L0 to L1 occurs, the USB system may not know when or how often the SOFs disappear until they are gone. The disappearance of the SOF markers may not necessarily be a problem for a host-device system to process and communicate USB data. However, in certain applications, such as audio, video, and sensor applications, a notion of time or sharing of a reference is needed, required, and/or may be critical. In these applications, the ability for the USB system to know and track the existence of the SOF markers and when they appear is critical. This SOF marker disappearance problem may only become a larger issue as newer audio USB protocol versions, such as the USB audio class 3 standard, now require the device to generally accept L1 mode requests and only reject them under certain exceptional conditions or situations.

FIG. 1 further shows that when the USB system operates in the L0 only mode (e.g., see example "L0 Only Mode" timing signal diagram), a number of periodic "S" pulses appear which signify the periodic existence of SOF-to-SOF markers for demarcating the various data service intervals. However, FIG. 1 also shows that when the USB system operates in the L0/L1 alternating mode (e.g., see example "L0/L1" timing signal diagram below the "L0 Only Mode"), the "S" pulses signify SOF markers, the "A" pulses signify audio data/content, and the "Xs" signify the times when the USB device can no longer see or detect the SOF markers from the USB; that is, the SOF markers have disappeared from being detected by the USB device. When such disappearances of SOF markers occur, they may happen in an aperiodic manner. The SOF marker disappearances may occur in an aperiodic manner because the later re-appearance of an SOF marker may happen whenever the USB system (e.g., whether host and/or device) needs to wake up from a sleep state. The problem is that when the SOF markers from the host disappear at the device, the data is not guaranteed to be properly sent to the device (e.g., whether partially or at all) nor in a timely manner.

An existing way for the USB system to accommodate the different USB protocol versions and to also help resolve the SOF marker disappearance problem (e.g., dependency on USB data being communicated through only SOF markers) is through the use of bIntervals shown near the bottom of FIG. 1. A bInterval may be defined as a duration based on $2^{N-1}$ data service intervals where N is an integer that is one or greater and guarantees that data is sent sometimes within each bInterval. The bInterval does not rely on SOF markers for demarcating the data microframes/frames and thereby for when audio data is being communicated. For every bInterval, the host will send a bInterval of data to the device. However, there is no set time of when in that bInterval the data will be sent. Since bIntervals are defined based on a variable duration based on $2^{N-1}$ data service intervals, the bIntervals may end up being defined in terms of microframes (for High Speed operation) or frames (for Full Speed operation). The data may be sent aperiodically, that is, at different microframes/frames within each of the bIntervals. As an example, when N=3, the frequency of the bIntervals is 1 millisecond which is the same duration as the data service interval for USB Full Speed operation (e.g., USB 1.1). As another example, when N=1, the frequency of the bIntervals is 125 microseconds which is the same duration as the data service interval for USB High Speed operation (e.g., USB 2.0).

However, the problem with bIntervals is that there is no set time within each bInterval as to when the data is being sent. The rate at which data is sent is generally aperiodic, that is, it may vary from one bInterval to another bInterval. The aperiodic nature of the data being communicated in this manner from the host does not provide any useful information (e.g., information that would be periodic or steady) that the device may use to be able to recover or derive the clock that had been lost when the SOF markers disappeared. Thus, bIntervals do not leave the device with an effective way to be able to recover the clock that was lost at the host end.

SUMMARY

In accordance with the teachings of the present disclosure, one or more disadvantages and problems associated with existing approaches for clock management in a device may be reduced or eliminated.

In accordance with embodiments of the present disclosure, a method for recovering a device reference clock on a device, the device reference clock proportional to a host reference clock of a host, when clock signaling from the host to the device is unavailable, may be provided. The method may include measuring a ratio between the host reference clock and the device reference clock of the device by monitoring, with the device, host start-of-frame markers communicated from the host to the device, creating a recovered reference clock based on the measured ratio, and creating local start-of-frame markers that are phase locked with the host start-of-frame markers based on the recovered reference clock.

In accordance with these and other embodiments of the present disclosure, a device may include an input for receiving information communicated from a host to the device and a controller configured to recover a device reference clock on the device, the device reference clock proportional to a host reference clock of the host, when clock signaling from the host to the device is unavailable. The controller may recover the device reference clock by measuring a ratio between the host reference clock and the device reference clock of the device by monitoring, with the device, host start-of-frame markers communicated from the host to the device via the input, creating a recovered reference clock based on the measured ratio, and creating local start-of-frame markers that are phase locked with the host start-of-frame markers based on the recovered reference clock.

In accordance with these and other embodiments of the present disclosure, a method for generating a not-yet (NYET) signal in a recovered clock reference for recovering a device reference clock on a device, wherein the NYET signal indicates that the device is not yet ready for transition into a low power mode, in order to improve a quality of a recovered reference clock representative of a host reference clock of a host communicatively coupled to the device, may be provided. The method may include detecting receipt of start-of-frame markers from the host to the device, responsive to detecting receipt of the start-of-frame markers, determining whether a condition for NYET generation is being met, responsive to the condition for NYET generation being met, generating the NYET signal to cause the host to continue generating the start-of-frame markers, and responsive to the condition for NYET generation not being met, causing the device to generate an acknowledge signal for transition of the device into the low power mode.

In accordance with these and other embodiments of the present disclosure, a device may include an input for receiving information communicated from a host to the device and a controller configured to generate a not-yet (NYET) signal in a recovered clock reference for recovering a device reference clock on the device, wherein the NYET signal indicates that the device is not yet ready for transition into a low power mode, in order to improve a quality of a recovered reference clock representative of a host reference clock of a host communicatively coupled to the device. The controller may generate the NYET signal by detecting receipt of start-of-frame markers from the host to the device, responsive to detecting receipt of the start-of-frame markers, determining whether a condition for NYET generation is being met, responsive to the condition for NYET generation being met, generating the NYET signal to cause the host to continue generating the start-of-frame markers, and responsive to the condition for NYET generation not being met, causing the device to generate an acknowledge signal for transition of the device into the low power mode.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
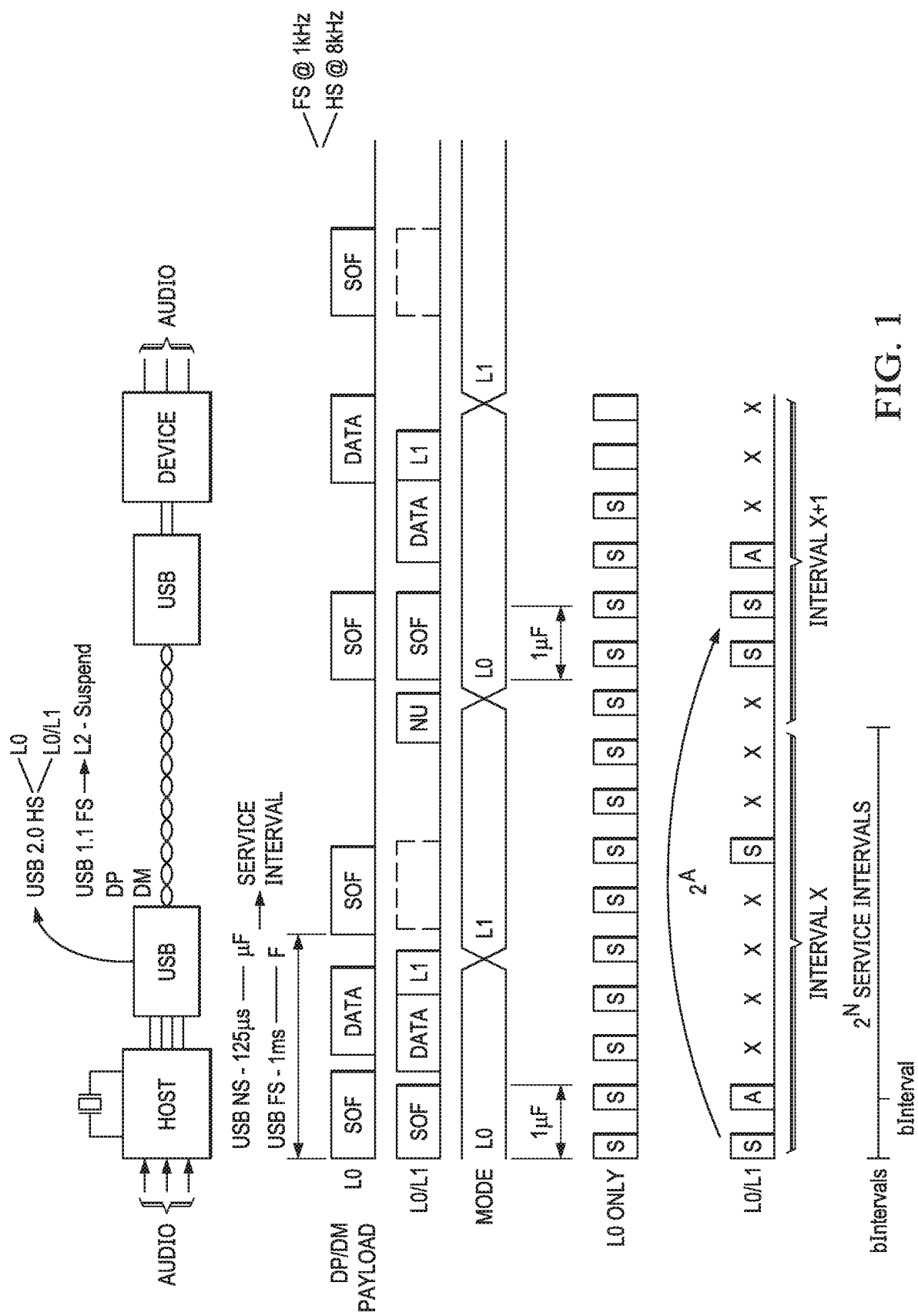
FIG. 1 illustrates timing diagrams for communication between a host and a device coupled to each other via a Universal Serial Bus, as is known in the art.
Figure 2:
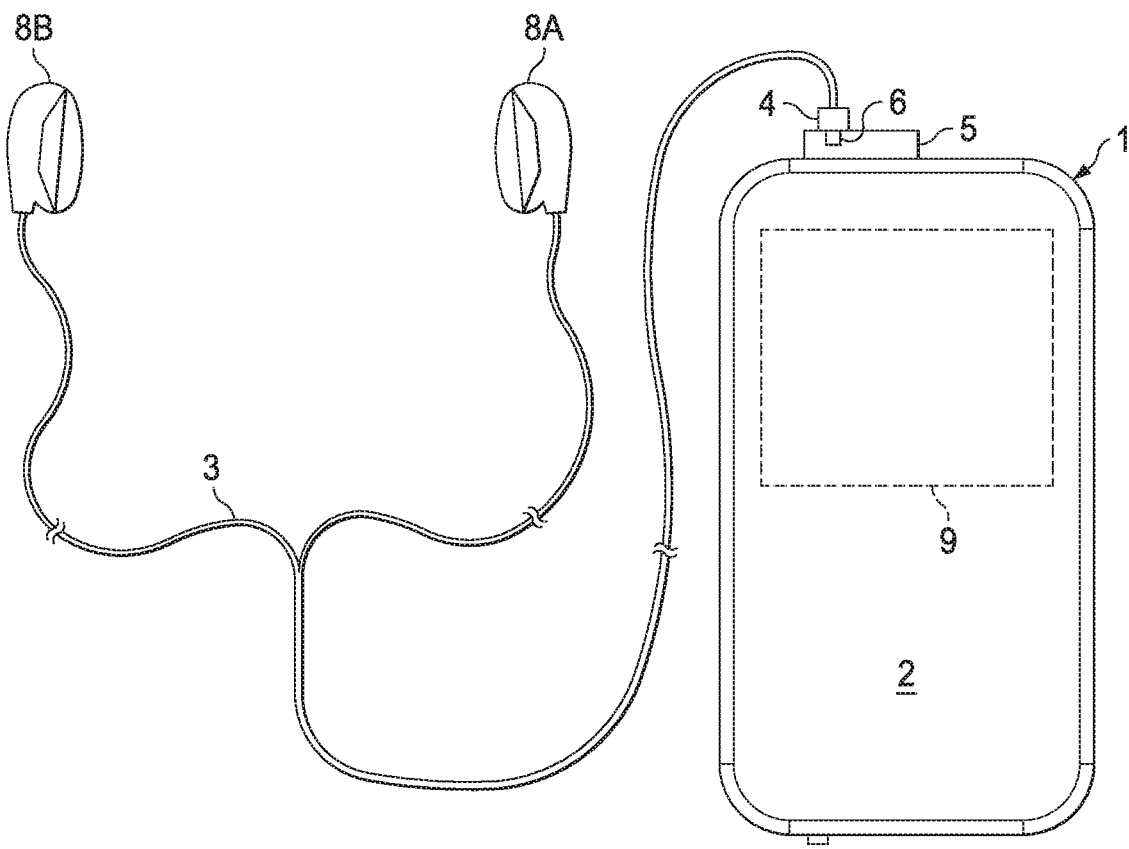
FIG. 2 illustrates an example personal audio device, in accordance with embodiments of the present disclosure.

FIG. 2 illustrates an example personal audio device 1, in accordance with embodiments of the present disclosure. Personal audio device 1 as depicted in FIG. 2 represents one of many types of devices that may operate as a host for communication over a communication protocol bus, such as USB for example. For instance, notebook computers, laptop computers, tablet computers, and desktop computers may also be examples of devices that may operate as a host for coupling to a device for purposes of this disclosure.

As shown in FIG. 2, personal audio device 1 may have coupled thereto a device 5, such as a USB device or adapter, for example. Device 5 may include a port 6 which serves as an electrical terminal for receiving one or more other peripheral devices, such that device 5 may serve as an interface between such one or more peripheral devices and personal audio device 1. As a non-limiting example, FIG. 2 depicts a headset 3 in the form of a pair of earbud speakers 8A and 8B, wherein headset 3 is coupled to personal audio device 1 via device 5. Headset 3 depicted in FIG. 2 is merely an example of a peripheral device, and it is understood that personal audio device 1 or any other suitable host may be used in connection with a variety of peripheral devices, including other audio devices (e.g., headphones, earbuds, in-ear earphones, and external speakers) or non-audio devices (optical devices, storage media, etc.). A plug 4 may provide for connection of headset 3 to port 6 of device 5. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 2, personal audio device 1 may include a processor 9 for controlling operation of personal audio device 1 and device 5 and headset 3 coupled thereto. As described in greater detail below, processor 9 may include or otherwise implement a plug-and-play device controller for managing device 5 and peripheral devices coupled thereto.

Figure 3:
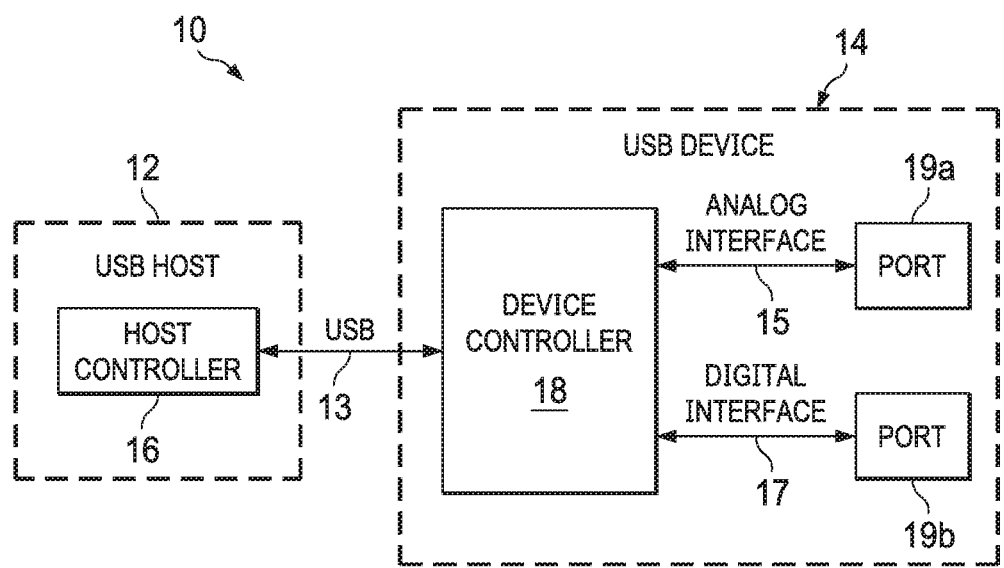
FIG. 3 illustrates a block diagram of an example system having a USB host and a USB device coupled via a USB bus, in accordance with embodiments of the present disclosure.

FIG. 3 illustrates a block diagram of example system 10 having a USB host 12 and a USB device 14 coupled via a USB bus 13, in accordance with embodiments of the present disclosure. USB host 12 may be any suitable host device, including without limitation personal audio device 1 depicted in FIG. 2. As shown in FIG. 3, USB host 12 may include, among other components, a host controller 16, as is known in the art. Host controllers and their functionality for providing an interface between a host system and other devices are well-known in the art.

As depicted in FIG. 3, USB device 14 may include a device controller 18 and a plurality of ports 19 (e.g., port 19a and port 19b). As shown in FIG. 3, in some embodiments, one or more ports 19 may be implemented with a 3.5-mm, 4-pole Tip-Ring-Ring-Sleeve (TRRS) receptacle. A 3.5-mm TRRS connector may support many different analog and digital connections. For example, port 19a may comprise an analog port coupled to device controller 18 via an analog interface 15, and may support analog devices including, without limitation, a line input device, a headset with a microphone, a headset without a microphone, a mono microphone, and/or a stereo microphone. As another example, port 19b may comprise a digital port coupled to device controller 18 via a digital interface 17, and may support digital devices including, without limitation, an optical input device and an optical output device. Thus, the appropriate device capabilities of USB device 14 may depend on what peripheral devices are inserted into ports 19.

In operation, and as described in greater detail herein, device controller 18 may be configured to recover a device reference clock on device 14, the device reference clock proportional to a host reference clock of host 12, when clock signaling from the host to the device is unavailable. In addition or alternatively, device controller 18 may be configured to generate a not-yet (NYET) signal in a recovered clock reference for recovering a device reference clock on device 14, wherein the NYET signal indicates that device 14 is not yet ready for transition into a low power mode, in order to improve a quality of a recovered reference clock representative of a host reference clock of host 12.

While much discussion in this disclosure contemplates a USB host coupled via a USB interface to a USB device and communicating via a USB protocol, the methods and systems disclosed herein may also be applied to any other suitable type of host coupled to any suitable device via any suitable communication protocol interface and suitable communication protocol.

Figure 4:
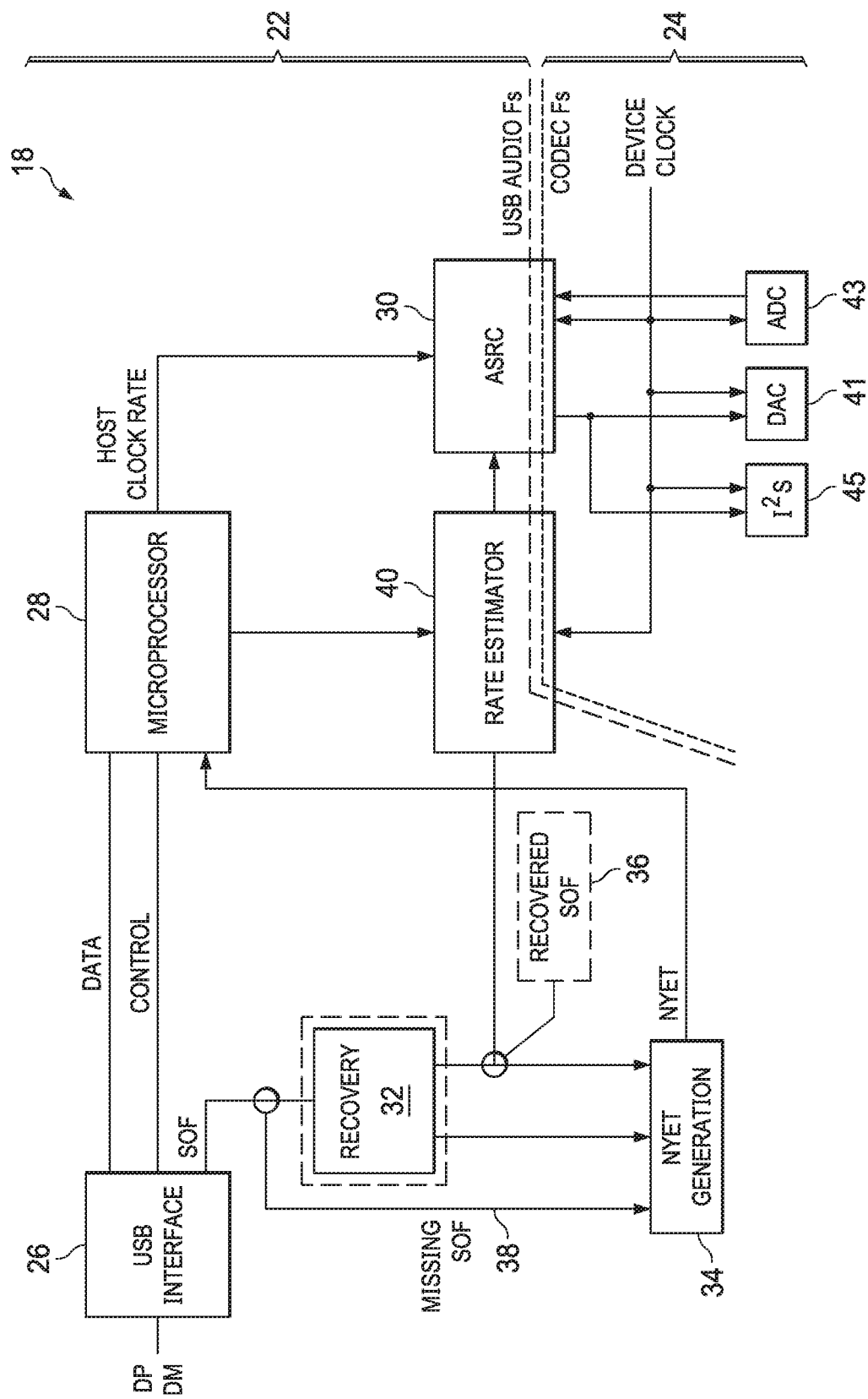
FIG. 4 illustrates a block diagram of a USB device controller, in accordance with embodiments of the present disclosure.

FIG. 4 illustrates a block diagram of a USB device controller 18, in accordance with embodiments of the present disclosure. In FIG. 4, the dotted line illustrates a demarcation within USB device controller 18 of a host clock domain 22 (e.g., that is related to a USB host clock and its USB clock rate) and a device clock domain 24. On the host clock domain 22 side, a USB interface 26 may receive DP and DM payload information and may feed data and control information into a microprocessor 28. Microprocessor 28 may provide the host clock rate to an asynchronous sample rate converter (ASRC) 30. USB interface 26 may also communicate SOF marker information to a recovery block 32. Recovery block 32 may provide received SOF marker information that includes information as to when the SOF markers are received as well as when SOF markers go missing or disappear. USB interface 26 may also directly provide missing SOF marker information 38 to a NYET generation block 34 while recovery block 32 may provide recovered SOF marker information 36 to NYET generation block 34. NYET generation block 34 may communicate its output to microprocessor 28. The operation of NYET generation block 34 is discussed and described in more detail below in conjunction with FIG. 10.

Recovery block 32 may also provide recovered SOF marker information 36 based on missing SOF marker information 38 to a sample rate generator or rate estimator block 40. Microprocessor 28 may output recovered USB rate information to rate estimator block 40 and ASRC 30. When SOF markers communicated from host 12 go missing or disappear, rate estimator block 40 may generate a recovered reference clock that is proportional to a host reference clock (e.g., USB host clock), and device 14 is then provided with the recovered reference clock.

Because the host reference clock is recovered, ASRC 30 may use the recovered reference clock to generate a codec sampling frequency Fs in accordance with a device reference clock when the SOF markers disappear. As shown in FIG. 4, the recovered device reference clock may be used as a clock reference to components of device clock domain 24 (e.g., a digital-to-analog converter (DAC) 41, an analog-to-digital converter (ADC) 43, and/or a component 45 operating in accordance with the Inter-Integrated Circuit Sound ($I^2S$) protocol.

Communication across the USB protocol between host 12 and device 14 may be achieved through the use of an asynchronous clock base when the USB link is operating in Synchronous Mode. The ASRCs that are used to sample rate convert the communicated data may require signals that are based on a Frequency Sample Input (Fsi) to Frequency Sample Output (Fso) ratio. When processing the asynchronous data between host and device, it may be desirable to use usual codec ASRCs in their normal operation of performance and manner for locking, but buffer over/underflows may need to be avoided.

Also, a physical interface (PHY IP) such as DP/DM may not provide a phase locked clock to a clock base for the host. It may not be desired to have to separately provide a phase locked loop (PLL) or crystal to the device for providing the clock. However, there is a desire to support the use of the USB L1 sleep mode that allows host 12 to shut down the communication link for up to 4 milliseconds during which time the frequency reference from host 12 disappears. A desire may be to support a synchronous mode in which host 12 sends data at a rate proportional to a reference that it sends rather than a reference from the device.

The actual skip pattern of the reference from host 12 to device 14 may be aperiodic. In other words, host 12 may not be required to provide a sub-harmonic of the SOF period; host 12 may either send or not send without the requirement of any regularity or periodicity as long as it does not leave more than 4 milliseconds between send times.

Embodiments of the present disclosure may provide a mechanism for recovery of the reference (e.g., recovered USB host clock) at a sample rate of the SOF markers at 8 kHz (or other sample rates) in USB without the use of a crystal or external clock and in the presence of actual received reference being as rare as 250 Hz. The embodiments of the present disclosure may utilize a recovery loop that tightly tracks the received SOF markers and a downstream ASRC estimator that deals with high frequency filtering. The SOF markers may be received by device 14 from an 8-kHz signal of host 12 that is always running and does not stop when the USB system is operating in the L1 sleep mode. All SOF markers that are received by device 14 from host 12 may be based on the 8-kHz signal, but when operating in the L1 mode, device 14 may potentially not receive an SOF for up to 4 milliseconds. The SOF marker may be a better reference than a local clock (e.g., a liquid crystal oscillator) of device 14, because an SOF marker is based on a crystal and may be synchronous to the received data sample rates. A signal that toggles on the receipt of the SOF marker from a USB controller may be utilized, and it may be synchronized and edge detected.

An ultimate goal of the rate recovery is for the Fsi/Fso signals mentioned above to feed the ASRC and the FIFO controls facing them for the USB domain data (e.g., labeled as "recovered sample rates" in FIG. 4). An ASRC does a good job filtering higher frequency jitter with its own sample rate estimator. However, the desire is to not introduce low frequency jitter, particularly around 1 Hz. Thus, a loop filter that does not have a resonance hump at 1 Hz and that has good tracking characteristics may be selected in a particular embodiment. In the general case, the loop filter should be selected appropriately to the characteristics of the ASRC utilized.

Figure 5:
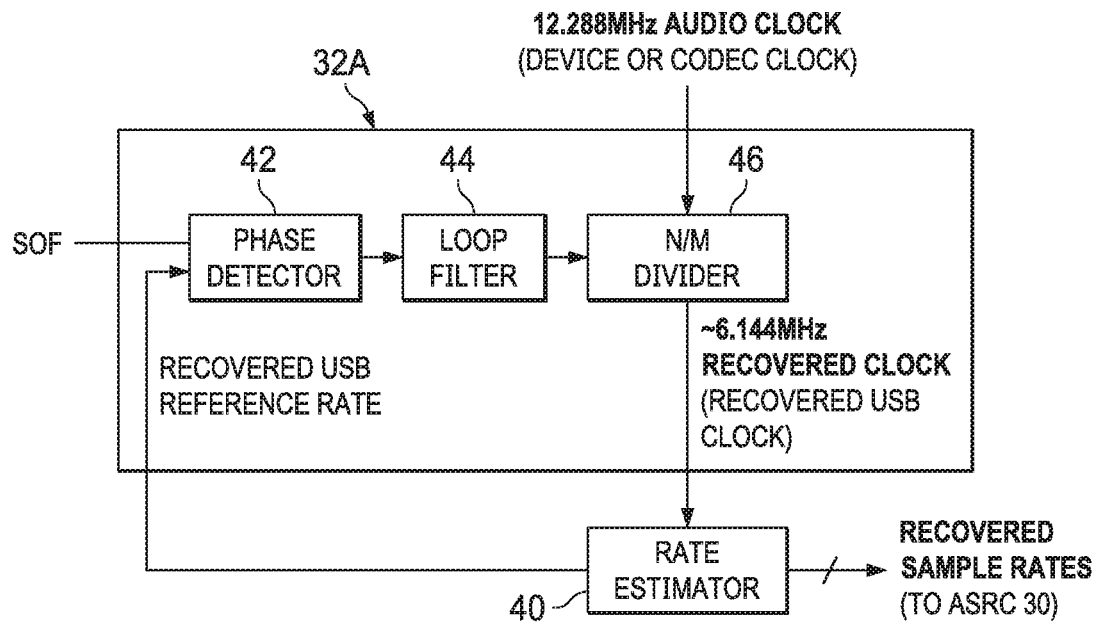
FIG. 5 illustrates a block diagram of a recovery block, in accordance with embodiments of the present disclosure.

FIG. 5 illustrates a block diagram of an example recovery block 32A, as interfaced with rate estimator 40, in accordance with embodiments of the present disclosure. In some embodiments, recovery block 32A may be used to implement recovery block 32 of device controller 18 of FIG. 4. As shown in FIG. 5, recovery block 32A may be arranged similarly to a phase lock loop ("PLL") with an important exception that recovery block 32A may not include an analog component, and thus, there is no analog signal that provides a clock rate or any guarantee that a SOF marker is received by the USB device at a rate of more than one per four milliseconds. As shown in FIG. 5, recovery block 32A may comprise a phase detector 42 for receiving an SOF marker from host 12, the output of which feeds a loop filter 44. The output of loop filter 44 may in turn be fed to an N/M divider 46. An audio clock (e.g., a 12.288 MHz clock), that is representative of the device reference clock, may be fed to N/M divider 46 and may be output as a recovered reference clock. For N/M divider 46, N may be representative of or proportional to the host reference clock while M may be representative of or proportional to the device reference clock. The recovered reference clock may be, in turn, fed to rate estimator 40. Rate estimator 40 may output a recovered USB reference rate signal or the recovered SOF marker signal and may feed the recovered USB reference rate or recovered SOF marker signal back to phase detector 42. Rate estimator 40 may also output recovered sample rates (e.g., to ASRC 30).

As mentioned above, phase detector 42 may receive SOF markers from host 12. When the SOF markers arrive at device 14, a comparison between the received SOF marker rate and the recovered SOF marker rate may be performed by phase detector 42. When an error is detected by the comparison performed by phase detector 42, the error may be communicated to loop filter 44 to adjust N/M divider 46 accordingly, such that N/M divider 46 may create a recovered reference clock (such as the approximate 6.144 MHz clock) proportional to the host reference clock.

For example, in an approach analogous to a proportional and integrated phase lock loop (PLL) approach, when an SOF marker is present at device 14 and the phase error is measured, a "proportional" operation may be performed to adjust the M in the N/M divider by the error amount to line up the phase within a certain time period (e.g., within 62.5 microseconds). In some instances, this adjustment may be of a large amount. After the error adjustment is made, the "proportional" operation may be ceased. Thus, the "proportional" operation may be considered to be a fast update. The "integrated" operation may represent a current estimate of the SOF frequency rate. The input to such integrator may be scaled down relative to the proportional adjustment. Thus, the "integrated" operation may be applied constantly, and the result of the "proportional" operation may be combined with it only during a fast update period, as shown by recover block 32B.

This recovery approach therefore takes advantage of rate estimator 40 that follows recovery block 32. Rate estimator 40 may be allowed to filter out high frequencies and thus additional efforts for filtering out high frequency when adjusting the N/M ratio of N/M divider 46 may be prevented or minimized. A phase may be quickly trued up, which allows for the "proportional" operation. The long-term frequency adjustment (e.g., "integrated" operation) may occur slowly enough to avoid oscillating. Furthermore, with the presence of rate estimator 40, the feedback of the recovered SOF may not need additional filtering for the path feeding back phase detector 42.

Figure 6:
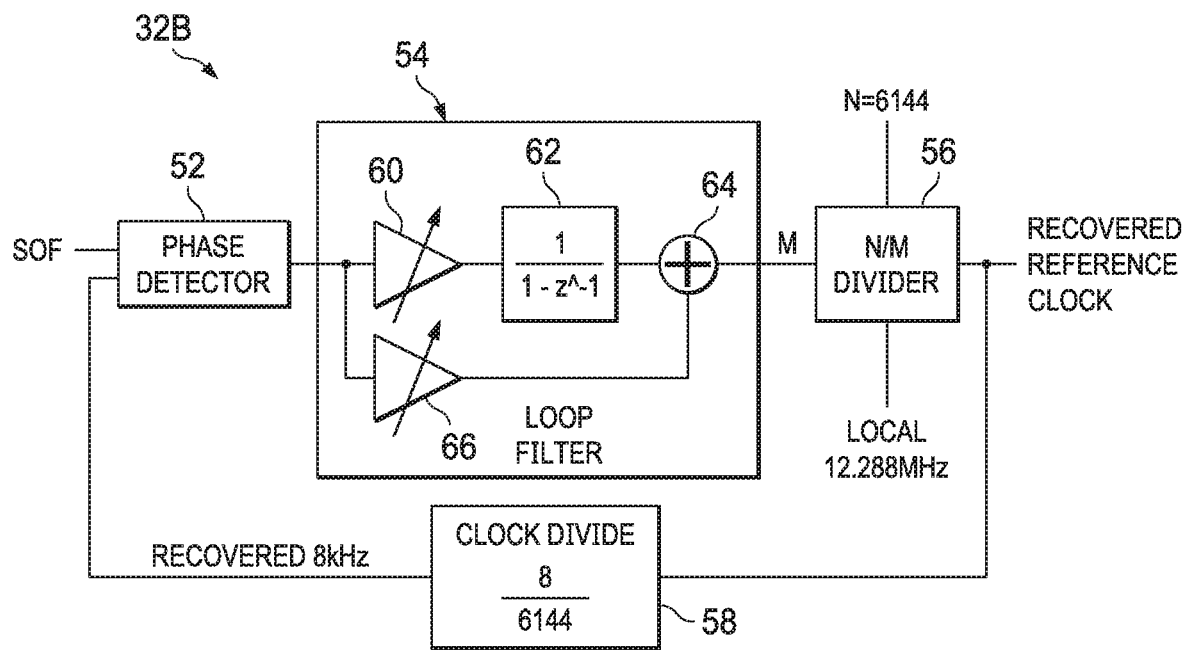
FIG. 6 illustrates a block diagram of another recovery block, in accordance with embodiments of the present disclosure.

FIG. 6 illustrates a block diagram of an example recovery block 32B, in accordance with embodiments of the present disclosure. In some embodiments, recovery block 32B may be used to implement recovery block 32 of device controller 18 of FIG. 4. Recovery block 32B of FIG. 6 may be thought of as a more traditional architecture than that of recovery block 32A of FIG. 5. As shown in FIG. 6, recovery block 32B may include a phase detector 52 and a loop filter 54. Phase detector 52 may receive an SOF marker rate from the host and also a fed-back recovered SOF marker rate from device 14. Loop filter 54 may comprise an integrated path that has a variable gain provided by gain element 60, an integrator 62 with transfer function $(1/(1-z^{-1}))$, and a summer 64 coupled together as shown in FIG. 6. Loop filter 54 may also have another variable gain provided by gain element 66 and coupled to summer 64 as shown in FIG. 5. The output of the summer 64 may be fed as an input M into an N/M divider block 56. The output of N/M divider block 56 may provide the recovered reference clock (e.g., approximately 6.144 Mhz). The recovered reference clock may be received by a clock divider 58 (e.g., performing an 8/6144 divide) such that clock divider 58 outputs a recovered SOF marker rate of approximately 8 kHz which is fed back to phase detector 52. In operation of recovery block 32B, when no error is detected by phase detector 52, the value propagating through the proportional path is zero and thus the integral path equals the value M input to an N/M divider 56.

A startup procedure may need to be performed for initializing the operation of recovery block 32 in FIGS. 4, 5, and 6. In accordance with one embodiment of such a startup procedure, recovery block 32 may receive SOF markers, and a time that is a particular duration later (e.g., a millisecond) may be measured. A millisecond may be used because it may be assumed that no L1 operation mode exists for that first millisecond that a USB link is first activated. Such time (e.g., one millisecond after receipt of an SOF marker) may be used as the initial value of an integrator of a loop filter 44 or 54 (e.g., an initial value of an integrated path of a loop filter state variable). Accordingly, the integrator may initially represent a decent or good enough frequency estimate, but does not know or have information regarding the phase or phase alignment. The integrated path may keep the long-term frequency as the correct ratio of host reference clock to device reference clock. A proportional path of a loop filter may correct the phase, and the correction of the phase may initially be large.

Figure 7:
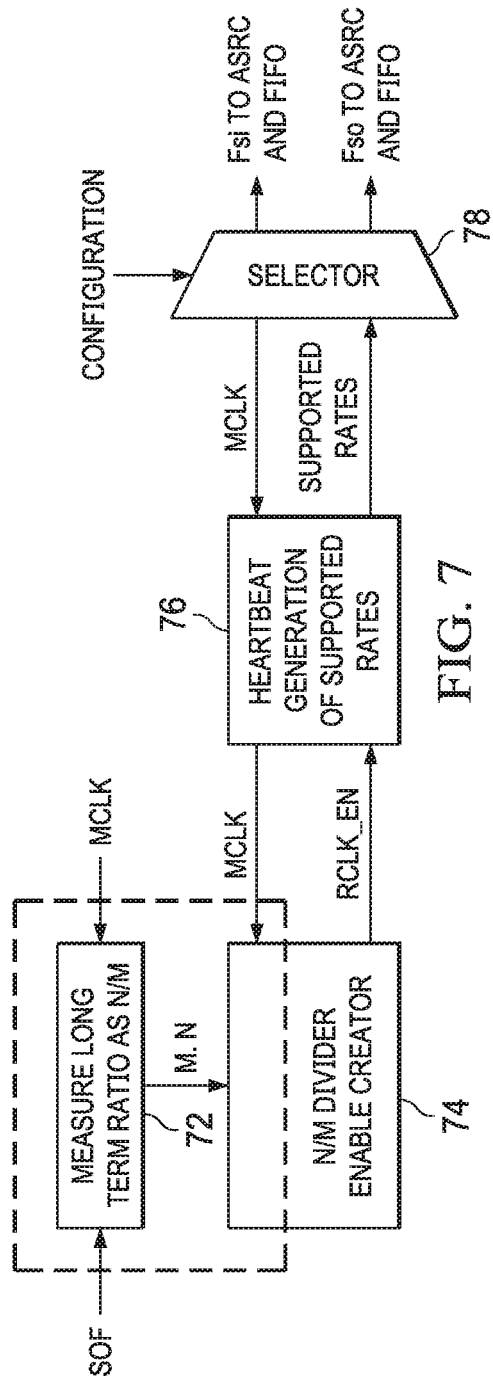
FIG. 7 illustrates a flow diagram showing functionality of a recovery block, in accordance with embodiments of the present disclosure.
Figure 8:
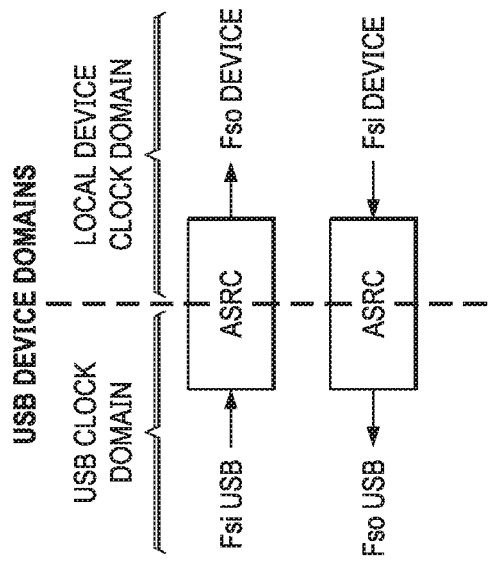
FIG. 8 illustrates a flow diagram showing conversion between a host clock domain and a local clock domain by an asynchronous sample rate converter, in accordance with embodiments of the present disclosure.

FIG. 7 illustrates a flow diagram showing functionality of a recovery block 32 (e.g., recovery block 32 shown in FIG. 4, recovery block 32A shown in FIG. 5, and/or recovery block 32B shown in FIG. 6), in accordance with embodiments of the present disclosure. As shown in FIG. 7, a first operational block 72 may measure a long term ratio as N/M, that is, a ratio between a host reference rate and a device reference rate. Such measurement may be achieved by monitoring SOF markers sent by host 12 to device 14 and comparing the SOF markers to a master device clock MCLK. First operational block 72 may generate values M and N which are passed to a second operational block 74, which may be an N/M divider enable creator. Second operational block 74 may receive the master device clock MCLK, perform a multiplication of the host rate-to-device rate ratio and the master device clock MCLK. As a result, second operational block 74 may provide a recovered clock enable RCLK_EN that may be used to provide the recovered reference clock (e.g., approximately 6.144 Mhz) to a third operational block 76. One skilled in the art may appreciate that the recovered clock enable and the clock generated (e.g., recovered reference clock) from the enable may include the same information, and that implementations of the present disclosure may use either or both. The recovered clock enable and/or the recovered reference clock may be used to create local SOF markers for device 14 that are phase locked with the monitored SOF markers from host 12. The recovered reference clock or the recovered clock enable may be used to track a microframe (mF) local to the device or to generate an audio reference clock. The audio reference clock may be used: 1) to generate one or more audio sample rates, 2) to generate information for an asynchronous feedback endpoint, 3) in synchronous sample rate conversion, or 4) in asynchronous sample rate conversion Third operational block 76 may comprise an operational block for providing a heartbeat generation of supported rates. Third operational block 76 may receive both the recovered reference clock and the master device clock MCLK. Fixed divides of the recovered reference clock may be performed to provide various desired sample rates or supported rates. A selector 78 may receive the sample/supported rates and may select a sample/supported rate based on a data rate that was used to send data and the USB configuration information for certain sample rates. Referring now to both FIG. 7 and FIG. 8, depending on a selected sample rate, selector 78 may send Frequency Sample Input (Fsi) samples to ASRC 30 that is at the host clock rate for the data that is to be converted from the host clock domain 22 to the device clock domain 24. Selector 78 may also send Frequency Sample Output (Fso) to another ASRC 30 that is at the local clock rate for the data that is to be converted to the host clock rate.

Figure 9:
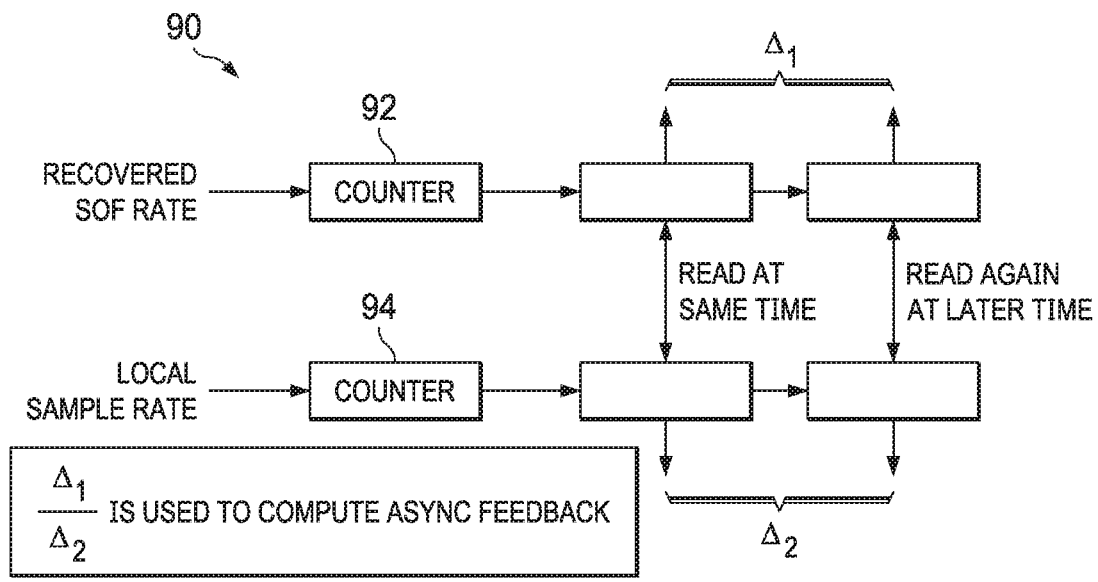
FIG. 9 illustrates a flow diagram depicting computation of an asynchronous feedback signal for reducing noise in a recovered clock signal, in accordance with embodiments of the present disclosure.

Referring again to FIG. 6, the recovered reference clock that is output from N/M divider 56 may be noisy. In a number of instances, such a noisy clock output is not an issue. However, there are applications in which such a noisy clock output may be an issue. Such applications include the use of such a recovered USB clock in system counters or a microframe count in a system. To that end, FIG. 9 depicts a flow diagram of a method 90 in which an asynchronous feedback signal may be generated by using a recovered SOF marker rate, and an asynchronous feedback signal may be generated based on the result of method 90 to smooth out the noisy recovered USB clock. As shown in FIG. 9, a recovered SOF marker rate may be fed into a counter 92, and a local sample rate (of the local reference clock) is fed into another counter 94. Both the recovered SOF rate and the local sample rate may be read at the same time and then read again later at another time. A first delta Δ1 between the first and second reads of the recovered SOF rate and a second delta Δ2 between the first and second reads of the device clock rate may be determined. The ratio between the first and second deltas Δ1/Δ2 may then be used by device controller 18 to compute an asynchronous feedback. The asynchronous feedback may be communicated from device 14 to host 12 to cause host 12 to either slow down or speed up the host reference clock so that the host reference clock matches the device reference clock.

Rate recovery by recovery block 32 may start as soon as device 14 begins receiving valid SOF markers. By the time the link has been configured, the local N/M estimates may be usable for rate generation (e.g., example full settle time is 20 milliseconds but a few milliseconds is enough). If N/M estimation is done through software instead of hardware, the software may be programmed to wait for the N/M estimate to be decent or at least good enough before the device 14 starts using them.

Figure 10:
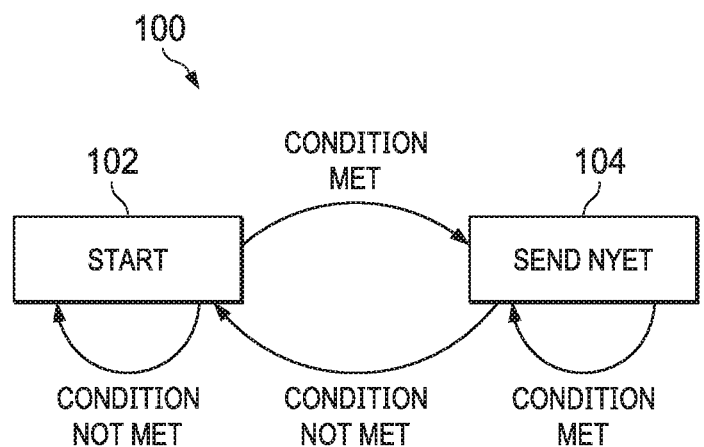
FIG. 10 illustrates an example state diagram for generation of a not yet signal, in accordance with embodiments of the present disclosure.

FIG. 10 illustrates an example state diagram 100 for generation of an NYET signal, in accordance with embodiments of the present disclosure. In some embodiments, the method represented by state diagram 100 may be performed by NYET generation block 34 shown in FIG. 4. The NYET generation in a recovered reference system for device 14 may be used to improve a quality of a recovered reference clock representative of a host reference clock for host 12. The NYET generation operation may start at a START state 102 as depicted in FIG. 10. At the START state, a detection of receipt of start-of-frame (SOF) markers by device 14 from host 12 may be performed, and device 14 may use the recovered reference clock. Upon detecting receipt of the SOF markers, a determination is made whether a condition has or has not been met. If a condition has not been met, the NYET generation operation stays at the START state and the USB device continues to use the recovered reference clock. However, if a condition has been met, the NYET generation operation moves from the START state to a SEND NYET state 104. At the SEND NYET state, an NYET signal is generated and sent to the USB device to halt the use of the recovered reference clock. The NYET generation operation may remain at the SEND NYET state and the use of the recovered reference clock may continue to be halted until the condition is no longer met. When the condition is no longer met, the NYET generation operation moves back from the SEND NYET state to the START state. The NYET generation operation then continues to repeat again from there.

Example conditions for the NYET generation operation include but are not limited to: 1) a predetermined amount of time has passed since the recovered reference system has last received signaling from the USB host; 2) if an error in the recovered reference clock exceeds a predetermined threshold; 3) if a predetermined number of microframes have passed since the recovered reference system has last received signaling from the USB host; or 4) if a predetermined number of microframes have passed since the recovered reference system has last received signaling from the USB host in consecutive microframes.

Figure 11:
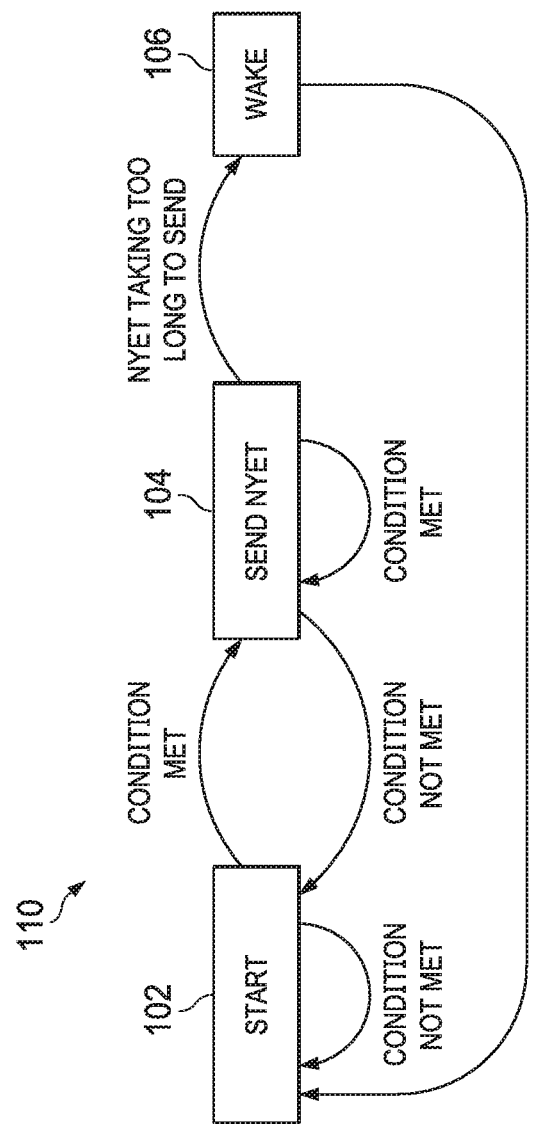
FIG. 11 illustrates another example state diagram for generation of a not yet signal, in accordance with embodiments of the present disclosure.

In situations where there are latency requirements, this generation may be selected to make sure that the system is resynchronized in enough time to meet the latency requirements. Likewise, the below description of a wake state 106 in connection with state diagram 110 of FIG. 11 below may be used in situations where latency requirements must be met and when there is not a timely NYET opportunity.

State diagram 110 may include an additional state 106 beyond that shown in state diagram 100. In the case where it is determined that an NYET should be sent, if no opportunity to send an NYET occurs soon enough, device 14 may wake up host 12 at state 106. Example conditions for deciding that an NYET is taking too long to be issued and a wake up is necessary may include but are not limited to: 1) a predetermined amount of time has passed since the recovered reference system has last received signaling from the USB host; 2) if an error in the recovered reference clock exceeds a predetermined threshold; 3) if a predetermined number of microframes have passed since the recovered reference system has last received signaling from the USB host; 4) if a predetermined number of microframes have passed since the recovered reference system has last received signaling from the USB host in consecutive microframes; or 5) the BSEL/HIRD resume time is longer than the time in which the USB device must issue an NYET to maintain accuracy.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method for generating a not-yet (NYET) signal in a recovered reference system for recovering a device reference clock on a device, wherein the NYET signal indicates that the device is not yet ready for transition into a low power mode, in order to improve a quality of a recovered reference clock representative of a host reference clock of a host communicatively coupled to the device, the method comprising:
   detecting receipt of start-of-frame markers from the host to the device;
   responsive to detecting receipt of the start-of-frame markers, determining whether a condition for NYET generation is being met;
   responsive to the condition for NYET generation being met, generating the NYET signal to cause the host to continue generating the start-of-frame markers; and
   responsive to the condition for NYET generation not being met, causing the device to generate an acknowledge signal for transition of the device into the low power mode.

2. The method of claim 1, wherein the condition comprises a passage of a predetermined amount of time since the recovered reference system has last received signaling from the host.

3. The method of claim 1, wherein the condition comprises an error of the recovered reference clock exceeding a predetermined threshold.

4. The method of claim 1, wherein the condition comprises passage of a predetermined number of microframes of the device since the recovered reference system has last received signaling from the host.

5. The method of claim 1, wherein the condition comprises passage of a predetermined number of microframes of the device since the recovered reference system has last received signaling from the host in consecutive microframes.

6. The method of claim 1, further comprising, in response to a latency condition occurring wherein the condition for NYET generation has occurred but an opportunity for communicating the NYET signal does not timely occur, waking up the host by the recovered reference system.

7. The method of claim 6, wherein the latency condition comprises at least one of:
   passage of a predetermined amount of time since the recovered reference system has last received signaling from the host;
   an error of the recovered reference clock exceeding a predetermined threshold;
   passage of a predetermined number of microframes of the device since the recovered reference system has last received signaling from the host;
   passage of a predetermined number of microframes of the device since the recovered reference system has last received signaling from the host in consecutive microframes; and
   a specified resume time is longer than a time in which the device must issue a NYET signal in order to maintain accuracy of the recovered reference system.

8. The method of claim 1, wherein the host is a Universal Serial Bus host and the device is a Universal Serial Bus device.

9. A device, comprising:
   an input for receiving information communicated from a host to the device; and
   a controller configured to generate a not-yet (NYET) signal in a recovered reference system for recovering a device reference clock on the device, wherein the NYET signal indicates that the device is not yet ready for transition into a low power mode, in order to improve a quality of a recovered reference clock representative of a host reference clock of a host communicatively coupled to the device, by:
   detecting receipt of start-of-frame markers from the host to the device;
   responsive to detecting receipt of the start-of-frame markers, determining whether a condition for NYET generation is being met;
   responsive to the condition for NYET generation being met, generating the NYET signal to cause the host to continue generating the start-of-frame markers; and
   responsive to the condition for NYET generation not being met, causing the device to generate an acknowledge signal for transition of the device into the low power mode.

10. The device of claim 9, wherein the condition comprises a passage of a predetermined amount of time since the recovered reference system has last received signaling from the host.

11. The device of claim 9, wherein the condition comprises an error of the recovered reference clock exceeding a predetermined threshold.

12. The device of claim 9, wherein the condition comprises passage of a predetermined number of microframes of the device since the recovered reference system has last received signaling from the host.

13. The device of claim 9, wherein the condition comprises passage of a predetermined number of microframes of the device since the recovered reference system has last received signaling from the host in consecutive microframes.

14. The device of claim 9, the controller further configured to, in response to a latency condition occurring wherein the condition for NYET generation has occurred but an opportunity for sending communicating the NYET signal does not timely occur, wake up the host by the recovered reference system.

15. The device of claim 14, wherein the latency condition comprises at least one of:

passage of a predetermined amount of time since the recovered reference system has last received signaling from the host;

an error of the recovered reference clock exceeding a predetermined threshold;

passage of a predetermined number of microframes of the device since the recovered reference system has last received signaling from the host;

passage of a predetermined number of microframes of the device since the recovered reference system has last received signaling from the host in consecutive microframes;

a specified resume time is longer than a time in which the device must issue a NYET signal in order to maintain accuracy of the recovered reference system.

16. The device of claim 9, wherein the host is a Universal Serial Bus host and the device is a Universal Serial Bus device.

* * * * *